FRANCIS B. MORSE.
Improvement in the Methods of Making Carriage-Steps.
No. 114,025. Patented April 25, 1871.

United States Patent Office.

FRANCIS B. MORSE, OF PLANTSVILLE, CONNECTICUT, ASSIGNOR TO H. D. SMITH & CO., OF SAME PLACE.

Letters Patent No. 114,025, dated April 25, 1871.

IMPROVEMENT IN THE METHODS OF MAKING CARRIAGE-STEPS.

The Schedule referred to in these Letters Patent and making part of the same.

*To all whom it may concern:*

Be it known that I, FRANCIS B. MORSE, of Plantsville, in the county of Hartford and State of Connecticut, have invented a new Improvement in Process for Forging Carriage-Steps; and I do hereby declare the following, when taken in connection with the accompanying drawing and the letters of reference marked thereon, to be a full, clear, and exact description of the same, and which said drawing constitutes part of this specification, and represents in—

Figure 1:
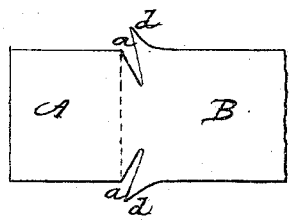
Figure 2:
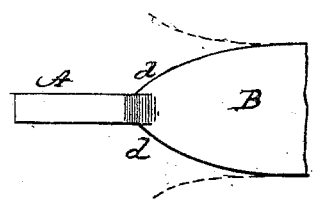
Figure 3:
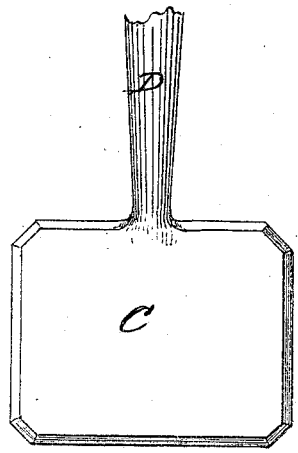

Figure 1, a view of the blank after the first operation;

Figure 2, the same after the second operation;

Figure 3, the pad complete; and in

Figure 4:

Figure 4, a side view of the step.

This invention relates to an improvement in forging the article of manufacture known to the trade as "carriage-step pads," that is to say, the foot-piece with a portion of the shank attached, usually of the form substantially as seen in fig. 3.

In this condition the blanks are furnished to the trade, the carriage manufacturers welding a rod to the shank of the length required for the brace.

The forging of the pad to the shank being a difficult operation is made much more cheaply by manufacturers who have machinery for the purpose, and can produce the articles in larger numbers than carriage-makers, who, owing to the few pads required, would be compelled to forge them by hand.

Heretofore, in the manufacture of these pads the shank has been welded to the pads, as may be seen in the patent granted to me for carriage-step, dated March 22, 1870.

This improvement is designed to avoid the necessity of welding, by making the step and shank from the same piece of metal, by the process more fully hereafter described.

I first take a bar of iron of a width and thickness proportionate to the size of the pad to be produced, the end of which is heated and placed in a press provided with cutters which cut diagonally into the opposite edges, as at $a\ a$ in fig. 1, turning up ears $d$, that portion A being of a size proportionate to the pad to be produced; then, while still hot, the part A is held firm and the bar B turned or twisted at right angles to the part A, as denoted in broken lines, fig. 2, and then immediately struck by a hammer or suitable swages to draw the ears or projections $d$ down onto the part A, as denoted in fig. 2.

This blank is then heated to a welding or suitable heat, and the part A placed in dies corresponding to the pad C, in figs. 3 and 4, with a recess upon the under side for the extension $b$ of the shank for the support of the pad, as seen in fig. 4, the shape of the pad being in accordance with the taste or demands of the trade.

The blank is then struck to fill the dies and form the pad, which is done at one or two blows; then the part B at the same heat is drawn down to form the shank D.

The blank may be entirely cut from the bar at the same time gashes $a$ are cut, as seen in fig. 1, and the blank handled by the tongs; or it may be cut from the bar at any subsequent stage; but I prefer to cut the blank from the bar at the first operation, as described.

This process saves one or two heats from the process where the two parts are welded together, and the step, when completed, is better than the welded step, inasmuch as the shank and pad are one and the same piece, strengthened at their junction by the twisting of the bar and overlapping of the ears $d$.

The angular cuts $a$, while they form the overlapping ears $d$, also leave the metal for forming the extension of the shank in the best position for forcing it into the desired shape, the metal required for the formation of the pad proper being only that within the right angles denoted by the broken lines from $a\ a$.

I claim as my invention—

The herein-described process for forming carriage-step pads C with their shank D from one and the same piece of metal.

F. B. MORSE.

Witnesses:
E. E. PADDOCK,
W. R. SMITH.